United States Patent [19]

Loughlin

[11] Patent Number: 4,887,297
[45] Date of Patent: Dec. 12, 1989

[54] APPARATUS FOR PROCESSING STEREO SIGNALS AND UNIVERSAL AM STEREO RECEIVERS INCORPORATING SUCH APPARATUS

[75] Inventor: Bernard D. Loughlin, Centerport, N.Y.

[73] Assignee: Hazeltine Corporation, Greenlawn, N.Y.

[21] Appl. No.: 936,541

[22] Filed: Dec. 1, 1986

[51] Int. Cl.$^4$ .............................................. H04H 5/00
[52] U.S. Cl. ............................................. 381/15; 381/4
[58] Field of Search ................ 381/15, 16, 1, 2, 3, 381/4

[56] References Cited

U.S. PATENT DOCUMENTS

| | | | |
|---|---|---|---|
| 3,219,759 | 11/1965 | Dome | 381/4 |
| 4,018,994 | 4/1977 | Kahn | 381/15 |
| 4,426,728 | 1/1984 | Kahn | 381/15 |
| 4,503,554 | 3/1985 | Davis | 381/1 |
| 4,535,470 | 8/1985 | Yokoya et al. | 381/15 |
| 4,541,109 | 9/1985 | Shimizu et al. | 381/15 |
| 4,637,044 | 1/1987 | Rindal | 381/4 |
| 4,648,114 | 3/1987 | Ichikawa | 381/15 |
| 4,707,856 | 11/1987 | Tanaka et al. | 381/15 |
| 4,748,669 | 5/1988 | Klayman | 381/1 |

Primary Examiner—Forester W. Isen
Attorney, Agent, or Firm—E. A. Onders

[57] ABSTRACT

Multi-system or "universal" AM stereo receivers are provided which require no switching of the receiver's stereo decoder circuitry regardless of which AM stereo system signal is being received. In accordance with one aspect of the invention, acceptable stereo sound is achieved for all AM stereo systems by introducing a selected amount of distortion correction in the L−R channel of the universal receiver and a selected phase difference between the L+R and L−R channels. In addition, perceived stereo separation in AM stereo and other stereo receivers is enhanced by also properly selecting the gain in the L−R channel in relation to the L+R channel.

11 Claims, 2 Drawing Sheets

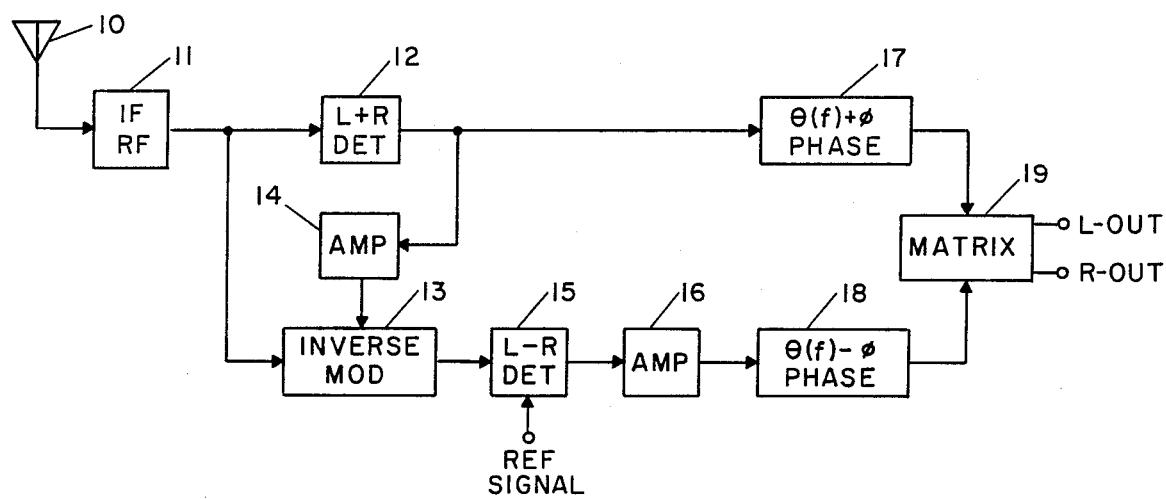
FIG. 1
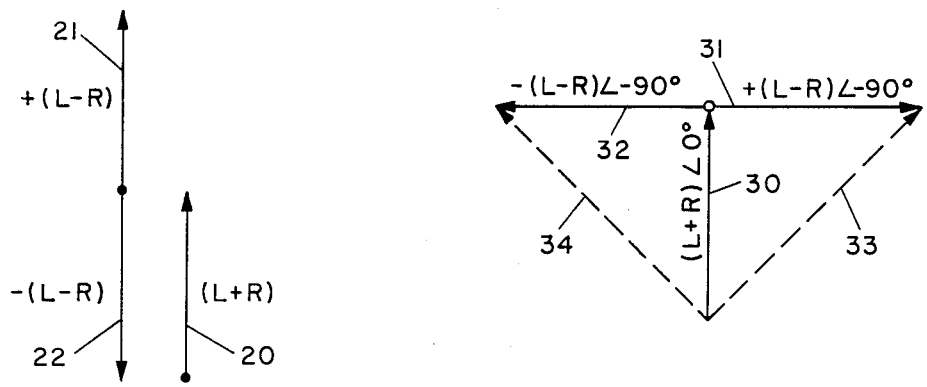
FIG. 2
FIG. 3

APPARATUS FOR PROCESSING STEREO SIGNALS AND UNIVERSAL AM STEREO RECEIVERS INCORPORATING SUCH APPARATUS

BACKGROUND OF THE INVENTION

This invention relates to stereo receivers for stereo radio broadcasts, and to apparatus for processing stereo representative signals in general.

On Mar. 4, 1982 the Federal Communications Commission (FCC) adopted a revolutionary Report and Order authorizing the so-called "marketplace approach" to the selection of a national standard for the transmission of stereophonic radio programs in the AM broadcast band (535-1605 kilohertz). Since then, several different AM stereo systems have been competing in the marketplace.

In the various AM stereo systems which have entered the marketplace, the left channel (L) and right channel (R) audio signals are added together to form an L+R signal, which is used to amplitude modulate the radio-frequency (RF) carrier in the usual manner. By subtracting the R from the L signal, an L−R signal is formed which is used to phase modulate (PM) the RF carrier in some AM stereo systems or, to quadrature modulate (QM) the carrier in others.

The transmitted signals from all AM stereo systems which have been and are currently being used in the United States are compatible with monaural AM receivers, but none are compatible with each other.

Because of this mutual incompatibility among the various systems, receiver manufacturers have been faced with the choice of designing AM stereo receivers for one system only (so-called "single-system" receivers), or receivers capable of stereophonic reception of signals of more than one of the systems being broadcast (so-called "multi-system" receivers). Both types of receivers are available in the marketplace.

Multi-system receivers have been of two general types. Some include pilot-signal detection circuits which provide automatic switching of those receiver circuits required to properly decode the particular type of AM stereo signal being received. Other multi-system receivers are equipped with manual switches for that purpose.

Among circuits that have been switched in multi-system receivers are: distortion-correction circuits, 90° phase-difference networks used in one of the AM stereo systems (the Kahn/Hazeltine system), limiters, and detectors. It is, therefore, an object of the invention to provide a multi-system or "universal" AM stereo receiver which requires no circuit switching, manual or automatic, in the stereo decoder, but which provides stereophonic reception of broadcasts that use any of the different AM stereo systems which remain in the marketplace. It is a further object of the invention to provide apparatus for processing stereo signals to produce enhanced perception of stereo separation, such as in an AM stereo receiver. A further object is to provide a low cost universal AM stereo receiver.

SUMMARY OF THE INVENTION

In accordance with one aspect of the present invention, there is provided a universal AM stereo receiver which includes means for receiving radio frequency (RF) AM stereo signals and for converting said signals to a corresponding intermediate frequency (IF) signal. The receiver also includes stereo decoder means, responsive to said IF signal, for processing said signal through the same decoding circuitry, regardless of which type of AM stereo system signal is being received, said circuitry developing L and R stereo audio output signals capable of producing acceptable stereo sound without the need for switching special circuitry into or out of the decoder when any particular AM stereo system signal is being received.

In accordance with another aspect of the present invention, there is provided apparatus for processing a pair of supplied (L+R) and (L−R) representative signals which apparatus includes means for modifying said supplied signals by imparting to them a selected relative phase difference over a predetermined portion of the audio frequency spectrum of said signals, said phase difference being substantially different than 90°. The apparatus also includes means for combining said modified (L+R) and (L−R) signals to produce L and R representative stereo audio output signals.

In accordance with yet another aspect of the present invention, there is provided apparatus for processing a pair of supplied (L+R) and (L−R) representative signals which apparatus includes means for modifying said supplied signals by imparting to them a predetermined relative difference in gain. The apparatus also includes means for combining said modified (L+R) and (L−R) signals to produce L and R representative stereo audio outputs signals.

In accordance with still another aspect of the present invention, there is provided an improved FM stereo receiver which includes means for receiving radio frequency (RF) FM stereo signals and for converting said signals to a corresponding intermediate frequency (IF) signal the receiver also includes means for processing said (L+R) and L−R) signals to produce corresponding (L+R) and (L−R) signals having a selected relative phase difference over a predetermined portion of the audio frequency spectrum of said signals, said phase difference being substantially different than 90° and means for combining said (L+R) and (L−R) signals to produce L and R stereo audio output signals.

BRIEF DESCRIPTION OF THE DRAWINGS

FIG. 1 shows a block diagram of the stereo decoder portion of a universal AM stereo receiver embodying the present invention.

FIG. 2 shows a vector diagram with a vector representing the decoded L+R signal and vectors representing the positive and negative decoded L−R signals at the same phase as L+R.

FIG. 3 shows a vector diagram with positive and negative L−R vectors at an angle of 90° with respect to the L+R vector.

Figure 4:
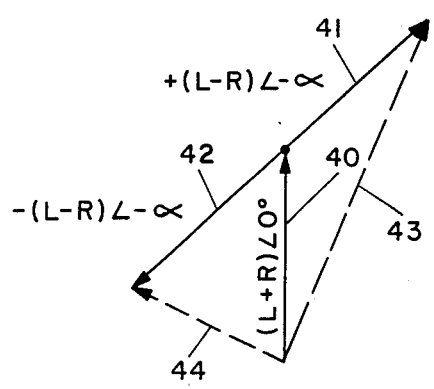
FIG. 4 shows a vector diagram with positive and negative L−R vectors at an angle -α with respect to the L+R vector.

This transformation shifts all Fourier components by 90° [see IEEE Standard Dictionary of Electrical and Eletronics Terms.]

DESCRIPTION OF THE INVENTION

The present invention enables construction of an AM stereo receiver which requires no switching in the stereo decoding circuits and which provides universal AM stereo signal decoding for any of the different AM stereo signal types being broadcast. The invention also provides enhanced perceived stereo separation to listeners of such receivers and of other stereo systems.

The 90° phase-difference networks used in receiver decoding circuits for the Kahn/Hazeltine Independent Sideband (ISB) AM Stereo System have, in prior art multiple-system receivers, been switched out of the circuit when signals of other AM stereo systems were being received. (With the present invention, the phase-shift networks need not be switched.) Instead, such networks are designed to provide a phase difference between the L+R and L−R channels of a selected amount less than 90° and preferrably within the range of approximately 30° to 60°, for example 45°. Although this compromises somewhat the mathematically calculated stereo separation for all AM stereo systems being received; nevertheless, the perceived separation is enhanced by another feature of the invention. The gain in the L−R channel is increased above the value normally required to optimize stereo separation, and the increased gain, in conjunction with the selected phase shifting in the aforementioned phase-difference networks, provides a significant increase in the subjectively perceived stereo separation.

Furthermore, AM stereo systems competing in the marketplace require distortion correction in the L−R channel of the stereo receiver. Receivers for one AM stereo system (Magnavox) have employed a limiter in the intermediate-frequency (IF) circuits prior to L−R signal detection. Receivers for other systems have employed inverse modulation with various degrees of correction. In one embodiment of the present invention, a fixed inverse modulation characteristic is used which provides sufficient distortion correction in the L−R channel for all systems.

Finally, since in universal AM stereo receivers which embody the present invention pilot-signal detection is not required for determining which AM stereo system's signal is being received, inclusion of such circuits is at the option of the receiver designer and if included, would serve to activate a stereo indicator light when a stereo broadcast is received.

A block diagram of a "universal" AM stereo receiver embodying the invention is shown in FIG. 1. Antenna 10 and RF/IF unit 11 may be of conventional design and construction, and serve to receive RF signals and to convert the received signals to a corresponding IF signal. The IF signal is coupled to the input terminals of both L+R detector 12 and inverse modulator 13.

L+R detector 12 may be an envelope detector, but other forms of detectors known to persons skilled in the art may be used instead. For example, a synchronous detector having an appropriate reference signal supplied to it could be used. It is to be understood that L+R detector block 12 in FIG. 1 can (if necessary) include means for filtering the detector output to reduce any residual spurious IF signal to an acceptably low level relative to the desired L+R signal output.

The output of L+R detector 12 is coupled to amplifier 14, whose gain is designed to meet the requirements of inverse modulator 13, as will be described shortly. The amplified L+R output of amplifier 14 is fed to inverse modulator 13 where it inversely amplitude modulates the supplied IF signal, effecting a reduction in quadrature distortion in the incoming signal by reducing the amplitude modulation on the signal prior to detection in L−R detector 15.

In the various AM stereo systems competing in the marketplace, at the transmitter the process of combining undistorted L+R envelope modulation with L−R phase, or quadrature, modulation in the transmitted signal results in distortion of the quadrature component of the modulation, which component is a function of the L−R modulation. In some systems correction of this distortion is accomplished partially at the transmitter stereo encoder and partially at the receiver decoder. In another system all correction is performed at the receiver.

For example, consider three different systems. In the Kahn/Hazeltine Independent Sideband (ISB) AM stereo system, approximately half the distortion reduction is effected at the transmitter stereo encoder, and half at the receiver decoder. Thus, an inverse modulation function of $1/1+0.5x$, for example, is required in the L−R channel of the receiver. In the denominator of the function, the "1" is a dc component which may correspond to the dc component of the detected L+R signal and "x" is the ac component. Thus, the denominator in this function can vary from 0.5 to 1.5.

In the Magnavox AM stereo system, distortion correction occurs entirely at the receiver decoder by means of an IF signal amplitude limiter. In this case an inverse modulation function of $1/1+x$ is required in the L−R channel of the receiver.

In the Motorola system, first order distortion correction takes place at the transmitter encoder, whereas correction for higher-order terms requires a $1/\cos\theta$ transfer function (where $\theta$ is the instantaneous carrier phase with respect to the unmodulated carrier phase) at the receiver decoder. However, the first-order decoder transfer function is simply 1.

From the above, it may be seen that an inverse modulator transfer function of $1/1+0.5x$ for the Kahn/Hazeltine system is conveniently approximately midway between the $1/1+x$ and the first-order 1 of the other two systems. Thus, an inverse modulation characteristic of $1/1+0.5x$ is a reasonable choice for a universal decoder. Using this characteristic the distortion in the modulation of the L−R component of the transmitted AM stereo signal is essentially corrected in the Kahn/Hazeltine system, and is effectively reduced in the other two systems. While $1/1+0.5x$ is a preferred compromise value for the inverse-modulator transfer function, the invention is not restricted to only that form, and receiver designers may employ other transfer functions within the scope of this invention. The gain of amplifier 14 is set to the value required to provide the desired transfer function in inverse modulator 13.

While inverse modulation is desirable in an AM stereo receiver for reduction of distortion in the received L−R component of the AM stereo signal, for low-cost receivers the receiver designer may choose to omit inverse modulator 13 and amplifier 14, but still retain the universal decoding and/or stereo separation enhancement features unique to this invention. Or, the designer may elect to switch among several different inverse-modulator transfer functions to provide more nearly optimum L−R distortion correction for each AM stereo system which may be received. A preferred method of switching this function would be by means of changing the gain of amplifier 14. Switching could be either manual or automatic. Automatic switching could be activated by detection of the pilot signal which is unique to the AM stereo system being received. Circuits for pilot signal detection and automatic switching are known to persons skilled in the art. Omission, or switching, of the inverse-modulator transfer function does not negate applicability of other features of the invention. In the embodiment of FIG. 1, the inversely modulated IF signal is coupled to L−R detector 15. Detector 15 normally is a synchronous phase, or quadrature, detector requiring a reference signal at the phase necessary to effect the desired phase or quadrature detection. Circuits for deriving such a reference signal are well known to those skilled in the art. For example, the reference signal may be derived from a phase-locked-loop driven by the output of an IF signal amplitude limiter. It will be understood that the L−R detector 15 in FIG. 1 would (if necessary) include means for filtering the detector output to reduce any residual spurious IF signal to an acceptably low level relative to the desired L−R signal output.

The L−R output signal from detector 15 is coupled to amplifier 16, where the signal is amplified to provide a selected level relative to the detected L+R signal, as will be described later.

The detected L+R signal and the amplified L−R signal are coupled to the inputs of phase-shift networks 17 and 18, respectively, as shown in FIG. 1. These circuits can be designed to provide (over a selected frequency range) a reasonably constant phase difference between the two channels. For example, in receivers designed for the Kahn/Hazeltine ISB AM stereo system the phase-shift ($\phi$) in networks 17 and 18, FIG. 1, is nominally ±45°, resulting in a 90° phase difference in the transfer functions of the L+R and L−R channels over a specified frequency range. Other AM stereo systems do not require these phase-shift networks. However, it will be shown that in accordance with the invention, a variant of these networks can be used advantageously in a universal AM stereo receiver for all systems.

For a better understanding of the invention, assume that the phase shift ($\phi$) in networks 17 and 18, FIG. 1, is nominally ±45° over a frequency range of 100–6000 Hz, for example. Further, assume that the universal receiver is receiving a Kahn/Hazeltine ISB AM stereo signal modulated with a left-only audio-frequency signal of 1000 Hz, for example. At the transmitter the phases of the L+R and L−R signals are shifted to provide a 90° phase difference between those two signals in order to obtain the essentially single-sideband characteristic of the transmitted ISB signal; however at the transmitter the phase shift ($\phi$) was negative in the L+R channel and positive in the L−R channel. The receiver phase-shift networks essentially restore the original phase relationship of L+R and L−R as it existed prior to the phase-shift networks in the transmitter, and with the gain of amplifier 14 properly adjusted, the vector representation of the L+R and L−R input signals to matrix 19 would be as shown in FIG. 2. In the matrix, L+R vector 20 and L−R vector 21 would add to produce a 2L output, provided L+R and L−R amplitudes were exactly equal. Similarly, if L−R vector 21 were subtracted from L+R vector 20 (or equivalently, if negative L−R vector 22 were added to L+R vector 20) the vectors would cancel, resulting in zero R output. Thus, L/R (stereo separation) can potentially be very large (infinite in the limit).

However, if the receiver with the assumed 90° phase-difference networks ($\phi$=45°) were to receive an AM stereo signal of one of the other competing systems, modulated with a left-only signal, the vector diagram for the input and output signals of matrix 19 would appear as shown in FIG. 3. In this case, the L+R and L−R vectors are in 90° relationship and the sum of L+R vector 30 and L−R vector 31 is vector 33, corresponding to the L output of matrix 17. Likewise, L+R vector 30 and negative L−R vector 32 combine to produce vector 34, corresponding to the R output of matrix 19. In this case, the relationship of the L and R outputs of matrix 19 (vectors 33 and 34, respectively) is L/R=1<90°, i.e., there is essentially no stereo separation. It must be understood, that in FIG. 3 the positive detected L−R signal may be at an angle of either + or − 90° with respect to the detected L+R signal, depending on the system being received, but this does not alter the conclusion that L/R=1<90° and there is essentially no stereo separation.

In accordance with the present invention, choice of the amount of phase-shift ($\phi$) provided in each of the networks 17 and 18 of FIG. 1 is not critical and can be in the range of 15° to 30°, for example, (giving a corresponding phase difference between the L+R and L−R channels in the range of 30° to 60°), and still provide performance within the scope of the invention. However, for purposes of explaining the operation and benefits of the phase-shift networks in the invention, a median value of $\phi$=22.5° (providing 45° phase difference in the transfer characteristics through phase-shift networks 17 and 18) will be used.

Assuming again, reception in the universal decoder of a Kahn/Hazeltine ISB signal modulated with L-only audio-frequency information, and with the L−R gain of amplifier 16 adjusted to make the amplitude of the L−R input to matrix 19 equal to the amplitude of the L+R input, the vector diagram for the input and ouput signals of matrix 19 would be as shown in FIG. 4. For the example chosen, the angle $\alpha$ in FIG. 4 is equal to 45°. Thus, L+R vector 40 and L−R vector 41 (equal in length) add in matrix 17 to form an output at the L terminal represented by vector 43. Similarly, L+R vector 40 and negative L−R vector 42 combine in the matrix to form an output at the R terminal corresponding to vector 44. With the parameters chosen for this example the ratio of the amplitudes of the L and R outputs (vectors 43 and 44, respectively) is L/R=2.414, corresponding to a stereo separation of 7.66dB. Similarly, if signals of other AM stereo systems were received, the angle $\alpha$ in the diagram of FIG. 4 may be positive or negative, depending on the system, but the basic operation in providing some separation for all systems would be the same.

While the stereo separation for circuit conditions corresponding to FIG. 4 is calculated to be 7.66dB, as described above, another phenomenon which enhances the perceived separation is present which is better explained in the following example.

Figure 5:
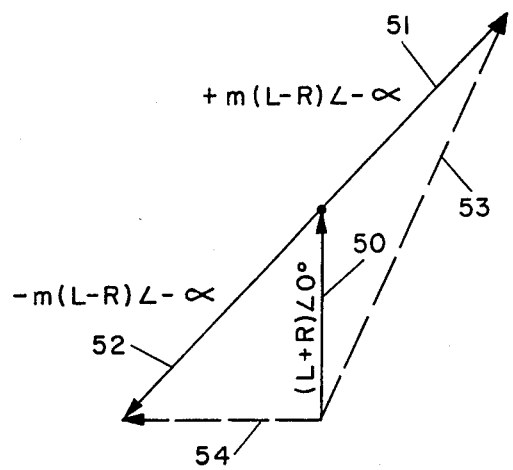
FIG. 5 shows a vector diagram of the type shown in FIG. 4, except that L−R has been multiplied by a gain factor, (m).

In this example, assume, as in the previous example that $\phi$ (in FIG. 1)=22.5° providing a phase difference of 45° between the transfer characteristics of the L+R and L−R channels, and that the gain of amplifier 16 in the L−R channel is adjusted to make (L−R)=√2(L+R). Also assume that the signal being received is a Kahn/Hazeltine ISB AM stereo signal modulated with a left-only audio-frequency signal. For these assumed conditions, the vector diagram for the audio-frequency signals at the inputs and outputs of matrix 19 is as shown in FIG. 5. For the example cited, m in FIG. 5 equals √2 and $\alpha=45°$.

As shown in FIG. 5, the L+R vector 50 and positive m(L−R) vector 51 are summed in matrix 19 to produce an output at the L terminal represented by vector 53. Similarly, L+R vector 50 and negative m(L−R) vector 52 are combined to produce an output at the R terminal represented by vector 54. The ratio of the L and R output amplitudes (vectors 53 and 54, respectively) is L/R=2.24 corresponding to a calculated stereo separation of 7.0dB. However, the separation perceived by listerners in this case corresponds more nearly to perfect separation, for reasons to be described below. Again, if the signals of other AM stereo systems are received, the vector diagrams will be essentially equivalent to the diagram in FIG. 5, except that the angle $\alpha$ may be positive or negative, depending on the system.

Figure 6A:
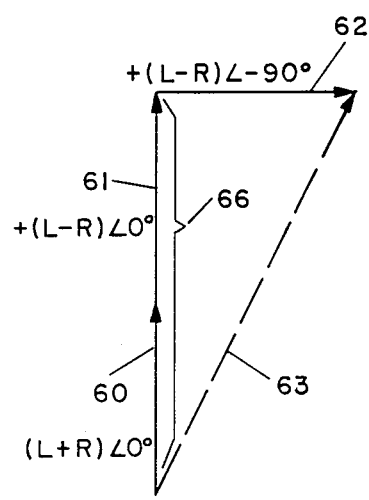
FIGS. 6A and 6B show two vector diagrams in which L+R is summed with positive and negative values of m(L−R), respectively, the same as was done in FIG. 5. However, in FIGS. 6A and 6B the ±m(L−R) vector is represented as having a ± component in phase with L+R and a quadrature component, i.e., the Hilbert transform of the in-phase component.
Figure 6B:
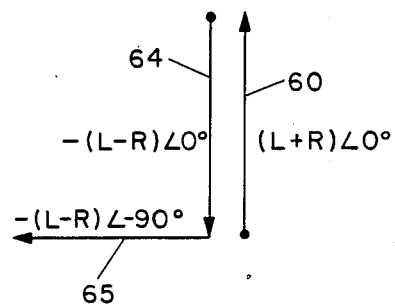

To further assist in understanding the manner in which the perception of stereo separation is enhanced using the invention, the vector diagram of FIG. 5 may be replaced by its equivalent in FIGS. 6A and 6B. In FIG. 6A, L+R vector 60 is the same as vector 50 in FIG. 5. However, the +m(L−R) vector 51 in FIG. 5 is represented by component 61 in FIG. 6A, in-phase with the axis of L+R vector 51, and the Hilbert transform of 61, which is quadrature vector 62. Thus, the vector sum of vectors 61 and 62 is equal to the +m(L−R) vector 51 of FIG. 5. Similarly, in FIG. 5, and vectors 64 and 65 are equivalent in-phase component and its Hilbert transform, respectively, of the −m(L−R) vector 52 in FIG. 5.

Therefore, in FIG. 6A, it can be seen that the left output of matrix 19, represented by vector 63 (equal to vector 53), has a component 66 at the phase of the L+R axis. This in-phase component 66 is the sum of vectors 60 and 61, and represents the L output intended in the transmitted signal. Also present in the L output of matrix 19 is the Hilbert transform component, vector 62, representing L−R in quadrature with the axis of the intended L-output signal. The effect of this quadrature L−R component will be described following the discussion of FIG. 6B below.

In FIG. 6B, the L+R vector 60 is the same as vector 50 in FIG. 5, and the −m(L−R) vector 52 in FIG. 5 is represented in FIG. 6B by its equivalent two vector components, vector 64 (at the same phase as the L+R axis), and its Hilbert transform, vector 65. Vectors 60 and 64 are combined in matrix 19 and effectively cancel at the R output of the matrix, as intended in the transmitted signal. However, there is also present in the R output the Hilbert transform, vector 65, representing L−R in quadrature with the axis of the desired signal output. Thus, considering for the moment only the in-phase components of FIGS. 6A and 6B, the potential for perfect, or near perfect, stereo separation exists. The effect of the quadrature components of the L−R signal in the ouput is explained as follows.

In the special case just cited in relation to FIGS. 5 and 6, L−R and L+R are in the relationship L−R/L+R=√2<45° for universal compatibility. In this case, L−R was shown to have a component of the intended value, i.e. the L−R component was of the amplitude and phase required to properly matrix with L+R to reproduce the originally intended L and R components in the transmitted signals. However, the additional L−R component, which is the Hilbert transform of the intended signal, is at an angle of 90° (which will be + or − depending on the system being received) with respect to the intended signal.

This Hilbert transform (quadrature) component of the L−R signal has the characteristics of a reverberant signal. For reverberant signals the L+R and L−R components of the stereo signal are essentially uncorrelated signals from all directions, and, in the example cited, another uncorrelated L−R component (the Hilbert transform, above) is present. Because of the non-directional nature of these signals by themselves, they have a reverberant characteristic. However, the matrixing of the in-phase components of L−R and L+R produces the originally intended directionally-correlated direct path signals with the proper time and intensity difference to provide localization to the listener. On the other hand, the remaining Hilbert transform component of the L−R signal, being at an angle of 90° with respect to the intended direct-signal, is uncorrelated and does not upset the intended time and intensity differences of the direct signal, and is present equally in the L and R outputs. Therefore, the criteria for properly localizing the intended signal have been maintained, and there has been a slight increase in reverberant power, calculated to be 1.76dB.

In the discussion related to FIG. 5, it was shown that conventionally calculated stereo separation for the case cited is 7dB. However, using the analysis just described the perceived stereo separation, or localization, can be perfect, or near perfect, with some added reverberation effect.

In the Jul./Aug., 1973 issue of Technology Review (published by MIT) an article by Amar G. Bose, "Sound Recording and Reproduction, Part Two, Spatial and Temporal Dimensions", pp. 25-33, dealt with some aspects of the above analysis. On p. 28 Bose states, ". . . virtually all of the audience in a concert hall is seated in the region where the reverberant field is dominant". He also said, "The reverberant field, while contributing nothing to our ability to localize, plays a very important role in our perception of the timbre of music". On p. 29 he goes on to say that a "small amount of direct sound is all that is required for localization". In his summarizations on p. 29, Bose stated, "From our studies of the spatial characteristics of sound fields, we learned that we should design loudspeakers so that they place the listener in a predominantly reverberant field through the use of the correct proportions of direct and reflected sound". In general the article substantiates the concept that a listener can localize a sound source in the presence of reverberation, even where the reverberant sound field is large in comparison to the direct sound field. It also confirms the desirability of providing reverberation effects for the listener.

Actual tests proved that the seemingly poor calculated stereo separation of 7dB in the example cited above was judged to sound better than (and in most cases was preferred to) normal stereo with much greater stereo separation, again confirming the analysis. Therefore, with a slight increase in reverberant energy this special case for universal stereo reception could be properly termed, "full stereo".

It should be noted that while the above example was based on reception of a Kahn/Hazeltine AM stereo system signal, the analysis is applicable to other systems as well. Further, the general principle of the L−R signal having a component at the same phase as L+R and a reverberant Hilbert transform component, still applies where the angle between the transfer characteristics of the L+R and L−R channels is other than 45° and where the L−R gain relative to L+R is other than the square root of two. Tests have shown that L−R gain enhancement up to at least 6dB has produced what has been judged to be more pleasing sound than conventional prior art AM stereo reception, in most cases. Gain enhancement in the L−R channel greater than 6dB, while producing otherwise pleasing effect, may result in deterioration of the signal-to-noise ratio which may not be deemed acceptable, depending upon the amount of enhancement.

Even where there is no gain enhancement, as in the conditions stated in the example represented by FIG. 4, and where the conventionally calculated stereo separation is only 7.66dB, using the analytic approach just described of separating L−R into an in-phase (with L+R) component and a quadrature, or reverberant, component, the true perceived separation is more accurately represented by the amount 15.3dB. This latter amount is the ratio of the components of the L and R outputs of matrix 19 corresponding to the sum and difference, respectively, of the in-phase components of the L−R and L+R inputs to the matrix.

The concept of producing a fuller, more pleasing sound through use of the above-described quadrature component of the intended L−R signal is not restricted to AM stereo systems only. Introduction of a relatively constant phase difference between L+R and L−R signals over a selected frequency range in other types of stereo systems, e.g. frequency-modulation (FM) stereo systems, possibly with L−R gain enhancement, will produce the above described pleasing reverberant effect.

Those skilled in the art will readily recognize that the apparatus comprising units 16-18, inclusive, in FIG. 1 can be incorporated in an FM stereo receiver, for example, between the outputs of the L+R and L−R signal detectors and the inputs of the matrix (corresponding to unit 19 in FIG. 1). Referring to FIG. 5, if $m=1/\cos \alpha$ the matrixing of L+R and the component of m(L−R) which is in-phase with the L+R axis will provide perfect, or near perfect stereo separation of the intended signal, and the quadrature component of (L−R) will provide the reverberant effect. However, even if this relationship of m and cos α is not maintained, the reverberant effect may be obtained with some compromise of separation, within the scope of the invention.

It will also be recognized that although the preferred universal case was described above as having 45° phase difference between the L+R and L−R channels, [45°+(N×90°)] is the general universal case. Thus, where N=0, the phase difference is 45°; where N=1, the phase difference is 135°; and so on. Therefore, although the 45° phase difference networks could be repalced with 135° networks, the 45° case was used for simplicity and to facilitate a better understanding of the present invention.

While there have been described what are currently believed to be the preferred embodiments of the present invention, those skilled in the art will recognize that other or further modifications may be made thereto without departing from the spirit of the invention, and it is intended to claim all such changes and modifications as fall within the true scope of the invention.

What is claimed is:

1. A universal AM stereo receiver, comprising:
   means for receiving radio frequency (RF) AM stereo signals and for converting said signals to a corresponding intermediate frequency (IF) signal;
   stereo decoder means, responsive to said IF signal, for processing said signal through the same decoding circuitry, regardless of which type of AM stereo system signal is being received, said circuitry developing L and R stereo audio output signals capable of producing stereo sound without the need for switching any stereo decoding circuitry within said decoder means when any particular AM stereo system signal is being received.

2. A universal AM stereo receiver, comprising:
   means for receiving radio frequency (RF) Am stereo signals which may represent either of at least two different types of AM stereo transmission systems and for converting said signals to a corresponding intermediate frequency (IF) signal;
   means responsive to said IF signal for detecting the (L+R) component thereof;
   means jointly responsive to said IF signal and to said detected (L+R) component of said IF signal, for detecting the (L−R) component of said IF signal;
   means for processing said detected (L+R) and (L−R) components to develop corresponding modified (L+R) and (L−R) signals by imparting to said detected components a selected relative phase difference over a predetermined portion of the audio frequency spectrum of said signals, said phase difference being substantially different than 90°;
   and means combining said modified (L+R) and (L−R) signals to develop L representative and R representative stereo audio output signals capable of producing stereo sound regardless of which type AM stereo system signals are being received.

3. A universal AM stereo receiver in accordance with claim 2, wherein said processing means includes means for imparting a predetermined relative difference in gain between said modified (L+R) and (L−R) signals compared with said detected (L+R) and (L−R) components.

4. A universal AM stereo receiver in accordance with claim 3, wherein said phase difference is approximately equal to, where N is an integer.

5. A universal AM stereo receiver in accordance with claim 4, where N=0 so that said phase difference is approximately 45°.

6. Apparatus for processing a pair of supplied (L+R) and (L−R) representative signals, comprising:
   means for modifying said supplied signals by imparting to them a selected relative phase difference over a predetermined portion of the audio frequency spectrum of said signals, said phase difference being substantially different from any integral multiple of 90°; and
   means for combining said modified (L+R) and (L−R) signals to develop L and R representative stereo audio output signals.

7. (Twice Amended) Apparatus for processing a pair of supplied (L+R) and (L−R) representative signals, comprising:

means for modifying said supplied signals to enhance the relative overall gain of said (L−R) representative signal by a predetermined amount and to impart to them a selected relative phase difference substantially different from any integral multiple of 90° over a predetermined portion of the audio frequency spectrum of said signals; and means for combining said modified (L+R) and (L−R) signals to develop L and R representative stereo audio output signals.

8. Processing apparatus in accordance with claim 7, wherein said phase difference is approximately 45°.

9. An improved FM stereo receiver, comprising:

means for receiving radio frequency (RF) FM stereo signals and for converting said signals to a corresponding intermediate frequency (IF) signal;

stereo decoder means, responsive to said IF signals, for decoding received FM stereo signals to develop a corresponding pair of (L+R) and (L−R) representative signals therefrom;

means for processing said (L+R) and (L−R) signals to develop corresponding modified (L+R) and (L−R) signals having a selected relative phase difference over a predetermined portion of the audio frequency spectrum of said signals, said phase difference being substantially different from any integral multiple of 90°;

and means for combining said modified (L+R) and (L−R) signals to develop L and R stereo audio ouput signals.

10. An improved FM stereo receiver in accordance with claim 9, wherein said phase difference is approximately 45°.

11. An improved FM stereo receiver in accordance with claim 9 or 10, wherein said processing means includes means for enhancing the relative overall gain of said (L−R) signal by a predetermined amount.

* * * * *

UNITED STATES PATENT AND TRADEMARK OFFICE
CERTIFICATE OF CORRECTION

PATENT NO. : 4,887,297
DATED : December 12, 1989
INVENTOR(S) : B. D. LOUGHLIN

It is certified that error appears in the above-identified patent and that said Letters Patent is hereby corrected as shown below:

Claim 4, Line 51, insert the following equation:

$[45° + (N \times 90°)]$ after the word "to".

Signed and Sealed this

Eighteenth Day of December, 1990

*Attest:*

HARRY F. MANBECK, JR.

*Attesting Officer*     *Commissioner of Patents and Trademarks*